United States Patent [19]

Hergenrother

[11] 3,968,495

[45] July 6, 1976

[54] INSTRUMENT LANDING SYSTEM

[76] Inventor: Rudolf Clemens Hergenrother, Rte. 2, 45 Hidden River Lane, Sarasota, Fla. 33870

[22] Filed: Mar. 6, 1975

[21] Appl. No.: 555,967

[52] U.S. Cl. ............................. 343/108 R; 343/109
[51] Int. Cl.² ...................... G01S 1/16; G01S 1/18
[58] Field of Search ........................ 343/109, 108 R

[56] References Cited
UNITED STATES PATENTS

3,908,189   9/1975   Buehler.............................. 343/109

*Primary Examiner*—Maynard R. Wilbur
*Assistant Examiner*—Richard E. Berger
*Attorney, Agent, or Firm*—George B. Oujevolk

[57] ABSTRACT

An aircraft instrument landing system for use on an aircraft runway to guide approaching aircraft along a glide path comprising in combination first and second directional transmitters to be disposed on the left and right sides of a runway for transmitting radio signals which will overlap including a high frequency oscillator complex for supplying a high frequency output carrier signal from each transmitter and modulator means for each transmitter supplying a pair of different identifiable modulation signals for each transmitter. Each transmitter defines a "reference plane" which is inclined to the horizontal in such a manner that the intersection of the two reference planes defines a desired glide path. Receiver means on the aircraft are disposed to receive said carrier signals and including narrow band pass filter means for separating the four identifiable modulation signals, detector means coupled to said filter means including resistor divider means to adjust the intensity of said signals and means to add and subtract the received signals, and, display means coupled to said detector means and including indicator means visibly indicating the position of the aircraft relative to a phantom glide slope reference plane, a phantom azimuth reference plane and visibly showing the signal displacement from said planes, and means to control the angle of the phantom glide slope reference plane at the receiver in the aircraft.

5 Claims, 15 Drawing Figures

FIG. 12b
FLIGHT PATH DISPLAY INSTRUMENT
COURSE DEVIATION INDICATOR

FIG. 12a
GLIDE SLOPE REFERENCE PLANE CONTROL

INSTRUMENT LANDING SYSTEM

BACKGROUND OF THE INVENTION

The present invention relates to an aircraft guidance system and more particularly to an instrument landing system whose transmitters are displaced to the side of the aircraft runway and in which the guided glide path can be controlled by the pilot of the aircraft.

BRIEF DESCRIPTION OF THE PRIOR ART

Instrument landing systems usually have two radio transmitters located on the ground, one of which is in the vicinity of the landing area and the other of which is on the runway center line beyond the far end of the runway plus a radio receiver in the aircraft that is being guided to the landing point. Each of the radio transmitters send signals that are of such a nature that a "reference plane" in space is defined for it and the signals received in the aircraft can be displayed to the pilot to show him if he is flying in the transmitter's reference plane or if he is to a greater or lesser degree to one side or the other of the reference plane. The intersection of the two reference planes defines a linear path in space and the transmitters are so designed and positioned that the intersection of these reference planes lies on the desired glide path which the aircraft should follow during a landing approach. The pilot controls the aircraft so that the received signal display shows that he is remaining on both of these reference planes and, thus, on the desired flight path.

Existing or proposed instrument landing systems have one transmitter defining a vertically oriented reference plane called the azimuth reference plane, lying in the direction or azimuth of the desired glide path. The other transmitter defines a reference plane perpendicular to the azimuth plane, but inclined at a small angle to the horizontal. This inclined reference plane is called the glide slope reference plane and its angle of inclination to the horizontal determines the desired slope of the glide path. The radio receiver in the aircraft detects the aircraft's left or right deviation from the azimuth reference plane which is displayed on an instrument as a deflection from center position of a vertical indicator needle. The radio receiver also detects the aircraft's position above or below the glide slope reference plane which is displayed on an instrument as a deflection from center position of a horizontal indicator needle. Both needles are located on the same instrument as "crossed pointers". The pilot operates the airplane controls to steer left or right and up or down to keep the crossed pointers centered and, thus, follows the glide path defined by the intersection of the two reference planes.

Present day landing systems of the type described, have a disadvantage in that the transmitter antennas producing the azimuth or vertical reference plane must lie in this plane which intersects the center of the runway and thus the transmitter antennas must lie somewhere along the airplane track. This location has to be sufficiently beyond the end of the runway to avoid obstruction to aircraft using the runway. As a result, these antennas are separated from the touch-down area by the full length of the runway. This large separation of the azimuth transmitter antennas from the touch-down area, results in undesired reflections of the radio waves from the runway surface which can cause spurious azimuth plane signals at the receiver.

The antennas of the transmitter producing the glide slope reference plane in the present day instrument landing systems, is located in the touch-down region, but must be displaced off to the side of the runway. This displacement limits the height above ground at which the glide slope reference plane can be effectively tracked by the receiver resulting in unreliability of this signal on the most critical part of the flight path, i.e., just prior to touch-down.

SUMMARY OF THE INVENTION

Briefly stated, the instrument landing system contemplated herein overcomes both of the foregoing disadvantages by a particular positioning of the two transmitters and a particular orientation of the reference planes which each one produces. The two transmitters are located in symmetrical positions on opposite sides of the runway in the area of the touch-down zone avoiding the location of an azimuth transmitter on the runway extention. Each transmitter defines a "reference plane" which is inclined to the horizontal in such a manner that the intersection of the two reference planes defines a desired glide path. The two transmitters are electrically similar and are encompassed in a common design. The only distinction between the two transmitters is the orientation of the antennas. Indeed, both transmitters may use the same carrier frequency, thus simplifying both the transmitters and the receiver. The only difference then is the modulation frequencies applied to the transmitter carriers, which permits the receiver to separate the signals received from each beam. The interchangeability of parts of the two transmitters results in a great reduction in the cost of manufacturing. The proximity of the two transmitters to each other results in a great reduction of servicing and maintenance costs. The receiver in the aircraft utilizes the signals from the two inclined reference planes to derive signals indicating deviations from a "phantom" azimuth reference plane and a "phantom" glide slope reference plane which signals can be displayed using the conventional crossed pointer display instrument for use by the pilot to guide the aircraft along the desired glide path. It is also possible to modify the received signals by simple circuit controls to allow the pilot to change the glide path slope or direction or both at will.

The invention as well as other objects and advantages thereof will be better understood from the following detailed description when taken together with the accompanying drawings, in which:

DETAILED DESCRIPTION

To understand the contemplated system it is first necessary to understand the prior art approach, the contemplated positioning of the instrument and the mathematical basis of the derivation of the signals corresponding to a phantom azimuth reference plane and a phantom glide slope reference plane from the reference planes produced by the transmitters.

Figures 1, 2:
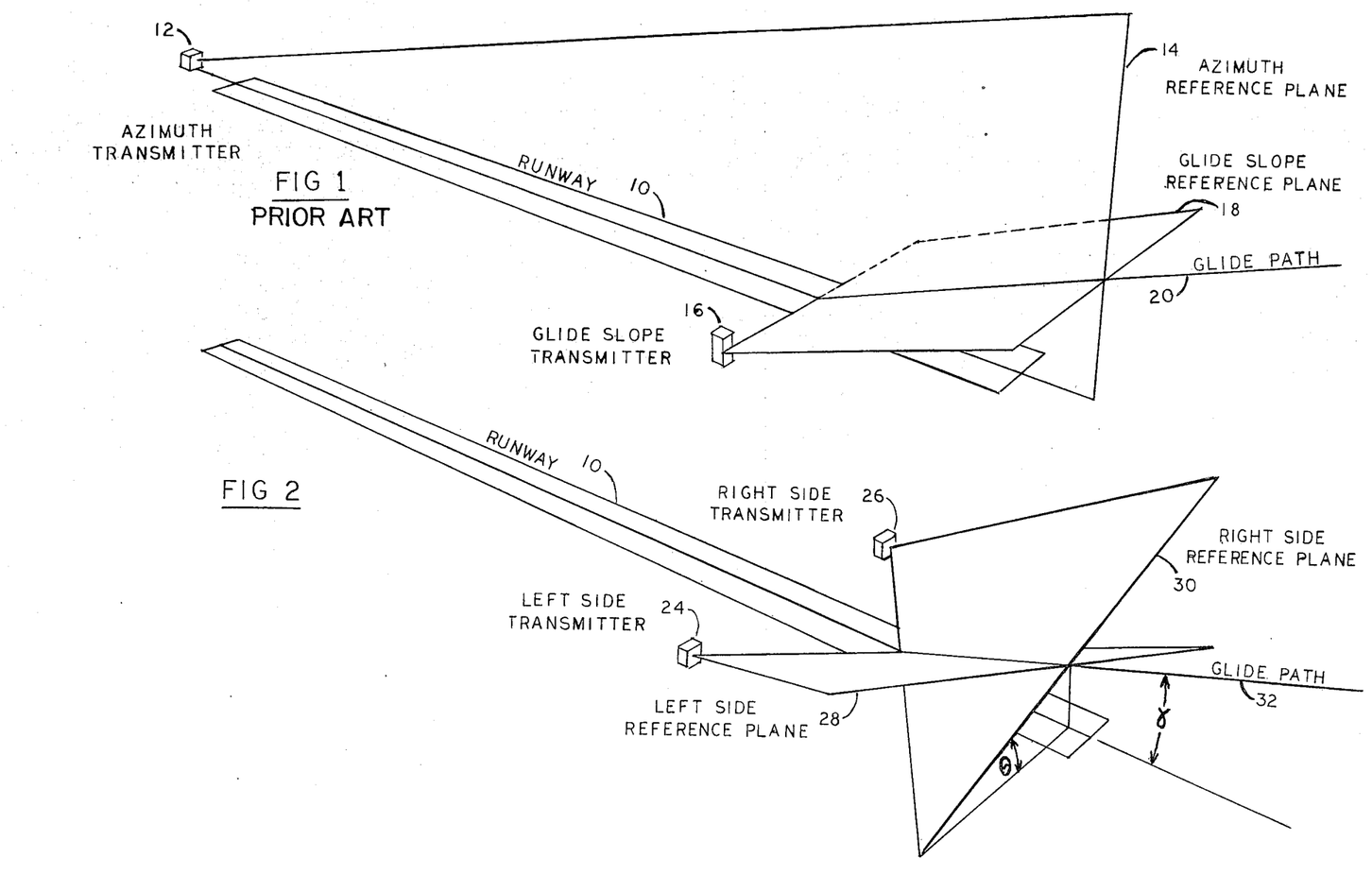
FIG. 1 is a perspective explanation of instrument landing system of the prior art.
FIG. 2 shares a similar perspective view of an instrument landing system contemplated herein.

The configuration of present day instrument landing systems is shown in FIG. 1 showing the location of azimuth transmitter 12 with azimuth reference plane 14, the glide slope transmitter 16, and the glide slope reference plane 18 in relation to the runway 10. The glide path 20 is defined by the intersection of the two reference planes 14 and 18.

The instrument landing system contemplated herein has two similar left side and right side transmitters 24 and 26 shown in FIG. 2 with their respective reference planes 28 and 30 in relation to the runway 10. Again the glide path 32 is defined by the intersection of two reference planes 28 and 30.

REFERENCE PLANES AND GLIDE SLOPE

The receiver produces two output signal voltages in the usual manner. One of these output signals is a measure of the displacement of the aircraft above or below the right side reference plane and the other output signal is a measure of the displacement of the aircraft above or below the left side reference plane. It is, however, desirable to show the aircraft displacement to the right or left of an azimuth reference plane and displacement of the aircraft above or below a glide slope reference plane. The reason for preferring this conventional display mode is that it is the natural mode for aircraft control (left or right and up or down). The receiver output signals indicating above or below the left side reference plane and above or below the right side reference plane are combined in such a way as to indicate displacement of the aircraft to the left or right of a phantom azimuth reference plane and displacement above or below a phantom glide slope reference plane. These signals derived from the receiver output signals are displayed on the conventional panel instrument now in use, whose indications can be followed by the pilot in the conventional manner to follow the glide path. The means of transforming the receiver signals corresponding to displacements from the left and right side reference planes of FIG. 2 to phantom azimuth and glide slope reference planes of the type shown in FIG. 1 is explained by reference to FIG. 3.

MATHEMATICAL EXPLANATION

Figure 3:
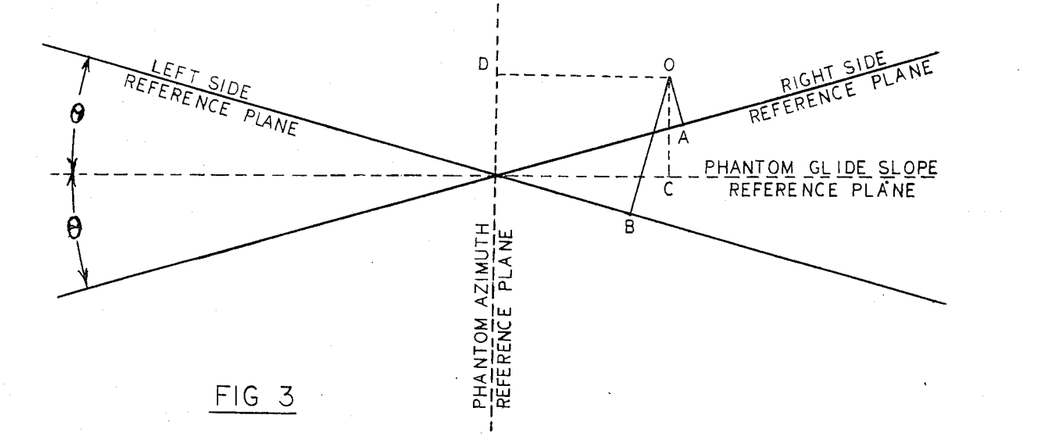
FIG. 3 presents a geometric explanation of the mathematical basis of the contemplated invention.

If the aircraft is located at some arbitrary point 0 in the Figure, the radio receiver in the aircraft will produce two output signals proportional to the deviation of the aircraft position from the respective left side and right side reference planes. The length of lines $\overline{OA}$ and $\overline{OB}$ in the Figure are assumed to be proportional to the output voltages of the two signals. It is required to derive from these two output signals, a new signal proportional to the length of the line $\overline{OD}$ to represent deviation of 0 from a phantom azimuth reference plane. It is also required to derive from the first two signals, a second new signal proportional to the length of the line $\overline{OC}$ to represent the deviation of 0 from a phantom glide slope reference plane.

Thus, as indicated by FIG. 3, a transformation is required to derive signals proportional to lengths $\overline{OD}$ and $\overline{OC}$ from signals proportional to lengths $\overline{OA}$ and $\overline{OB}$. This can be done by using the transformation equations for rotation of coordinates of a Cartesian coordinate system, "Standard Mathematical Tables, Chemical Rubber Publishing Co., 12th Edition, Page No. 415".

Transformation of the X coordinate of a Cartesian coordinate system by rotation of the axes by an angle $\theta$ about the origin gives:

$$X = X_1 \cos \theta - Y_1 \sin \theta \tag{1}$$

Where $X_1$ and $Y_1$ are the coordinates of X after rotation and also a counter-clockwise rotation means a positive angle and a clockwise rotation means a negative angle.

Referring to FIG. 3, if the axis for the left side reference plane is rotated to the phantom glide slope reference plane equation (1) gives:

$$\overline{OB} = \overline{OC} \cos \theta - \overline{OD} \sin \theta \tag{2}$$

If the axis for the right side reference plane is rotated to the phantom glide slope reference plane, equation (1) gives:

$$\overline{OA} = \overline{OC} \cos (-\theta) - \overline{OD} \sin (-\theta) \tag{3}$$

Adding equation (2) to equation (3) gives:

$$\overline{OB} + \overline{OA} = 2\overline{OC} \cos \theta \tag{4}$$

Thus by adding the received signal representing displacement from the left side reference plane to the received signal representing displacement from the right side reference plane, a signal is derived which is proportional to the displacement from a phantom glide slope reference plane.

Subtracting equation (2) from equation (3) gives:

$$\overline{OA} - \overline{OB} = 2\overline{OD} \sin \theta \tag{5}$$

Thus by subtracting the received signal representing displacement from the left side reference plane from the signal representing the displacement from the right side reference plane, a signal is derived which is proportional to the displacement from a phantom azimuth reference plane.

The receiver output signals are in the form of D.C. voltages so that they can be adjusted for the respective proportionality constant $2 \cos \theta$ or $2 \sin \theta$ and then algebraically added or subtracted by series connection either aiding or opposing each other. The transformations used above assumed that there is a linear relation between the displacement from the left side reference plane and the corresponding receiver output signal and likewise for the right side reference plane. Although this relation between displacement and signal strength may depart from linearity for large displacements, it will become more and more linear as the reference plane is approached and thus the display instrument reading becomes more and more accurate as the correct glide path is approached at which condition all net combined output signals converge to zero.

PRACTICAL EMBODIMENT

In a practical embodiment of the system a reference plane is produced at each transmitter by means of projecting two microwave beams in diverging directions. Each of these microwave beams carries a different low-frequency modulation which enables the receiver to distinguish the two beams by means of electrical filters which are tuned to the respective modulation frequencies.

The microwave beams are projected into space by means of antennas designed to direct the radio waves. One type of such antenna, known as the "horn antenna", shown in FIGS. 4A and 4B, and has a wave guide 34 and an H-flare pyramid horn 36. For design data on horn antennas see "Antenna Engineering Handbook", McGraw-Hill Book Co., First Edition, Chapter 10, Pages 10-1 to 10-17. The dimensions of the horn 36 and the waveguide 34 are shown in units λ of the wavelength for which the horn is to be used. The waveguide which is operated in the $TE_{10}$ mode produces an electric field E in the direction shown by the arrow. A typical radiation pattern of such an antenna is depicted in FIG. 5 which shows how the signal strength at a receiver would change for various angular positions of the receiver antenna as measured from the horn axis.

Figure 4A:
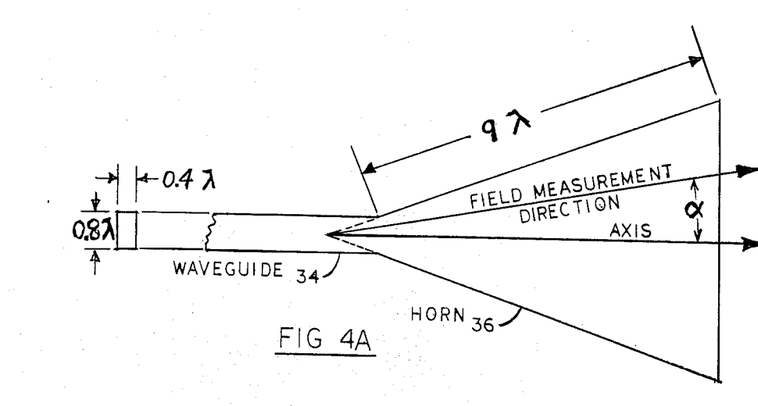
FIG. 4A is a side view of a microwave H-flare pyramidal horn.
Figure 4B:
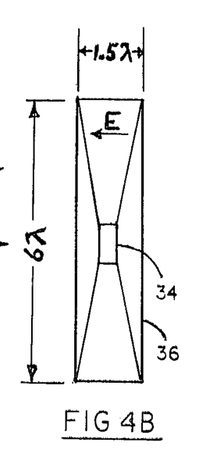
FIG. 4B is a front view of the microwave H-flare pyramidal horn of FIG. 4A.
Figure 5:
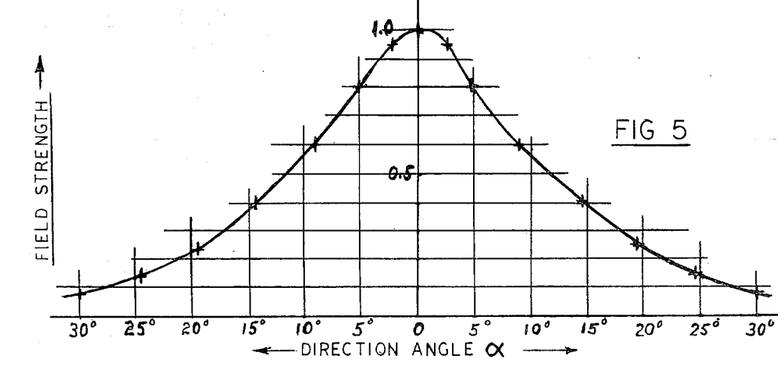
FIG. 5 shows a graph of relative field strength of the horn of FIG. 4.

The relative field strength computed for the H-flare pyramidal horn shown in FIGS. 4A and 4B is shown in FIG. 5. The horn directs the radiation towards the axis. The computed relative field strength for various directions indicated by angle α in FIG. 4 is shown in the curve of FIG. 5.

Figure 6:
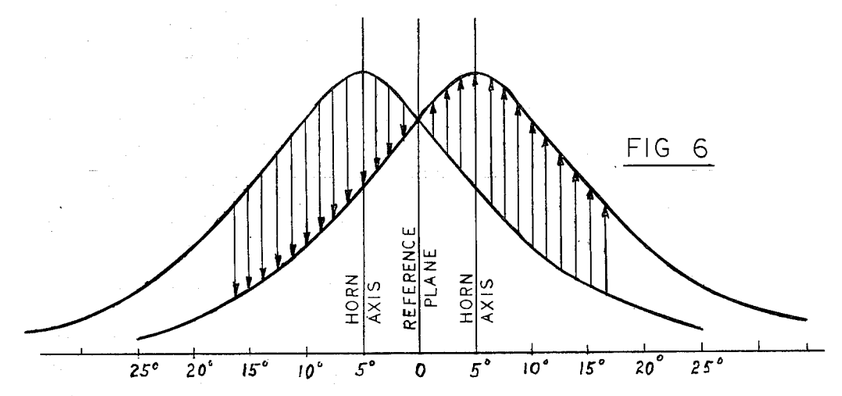
FIG. 6 is another graph showing signal amplitudes for a pair of pyramidal horns of FIG. 4 when the axes of the horns diverge by an angle of 10°.

By projecting the two beams so that the two horn axes diverge by an angle of say 10°, the receiver would distinguish two signals of different amplitude. These signal amplitudes are shown in FIG. 6 where the angular position of the receiver antenna is measured relative to the plane which bisects the divergence angle between the two horn axes (instead of relative to a horn axis as shown in FIG. 5), i.e., the signal amplitudes produced at the receiver output by each of the two horns of one transmitter are shown in FIG. 6. The net signal produced by balancing these signals against each other are shown by the length of the vertical arrows. The bisecting plane defines the receiver antenna location where the two signals are equal in amplitude. By balancing these two signals against each other they will cancel when the receiver is in this bisecting plane or "reference plane" and the net signal will change in amplitude and polarity as the receiver is moved to one side or the other of this reference plane.

Figure 7:
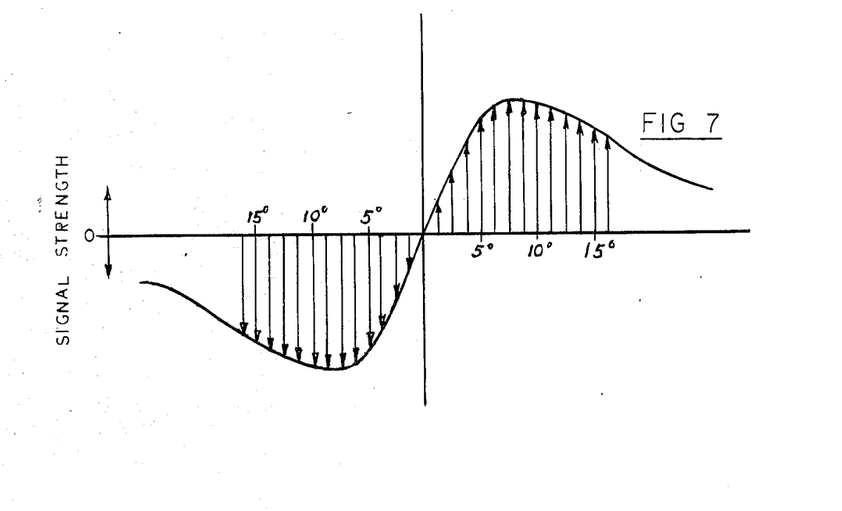
FIG. 7 represents a graph of the net difference signal indicated in FIG. 6.

The net signals indicated in FIG. 6 are plotted against the angular position of the receiver relative to the transmitter reference plane in FIG. 7 which also shows how the net output signal changes with displacement from the reference plane. This net output signal changes quite linearly with displacement near the reference plane where this is of maximum importance. At large angles away from the reference plane, the net signal amplitude decreases again but the signal still shows the correct sensing for the location of the reference plane which is the essential information when the receiver is far off the reference plane. The shape of the characteristic of FIG. 7 is governed by the particular antenna field pattern (FIG. 5) and the chosen divergence angle between the two horns.

TRANSMITTER ANTENNAS

The two transmitters which are located in symmetrical positions on opposite sides of the runway are alike except that their antennas are tilted in opposite directions as indicated in FIG. 2. The configuration of the antennas for one of the transmitters will now be described in greater detail.

Figures 8, 8A, 9:
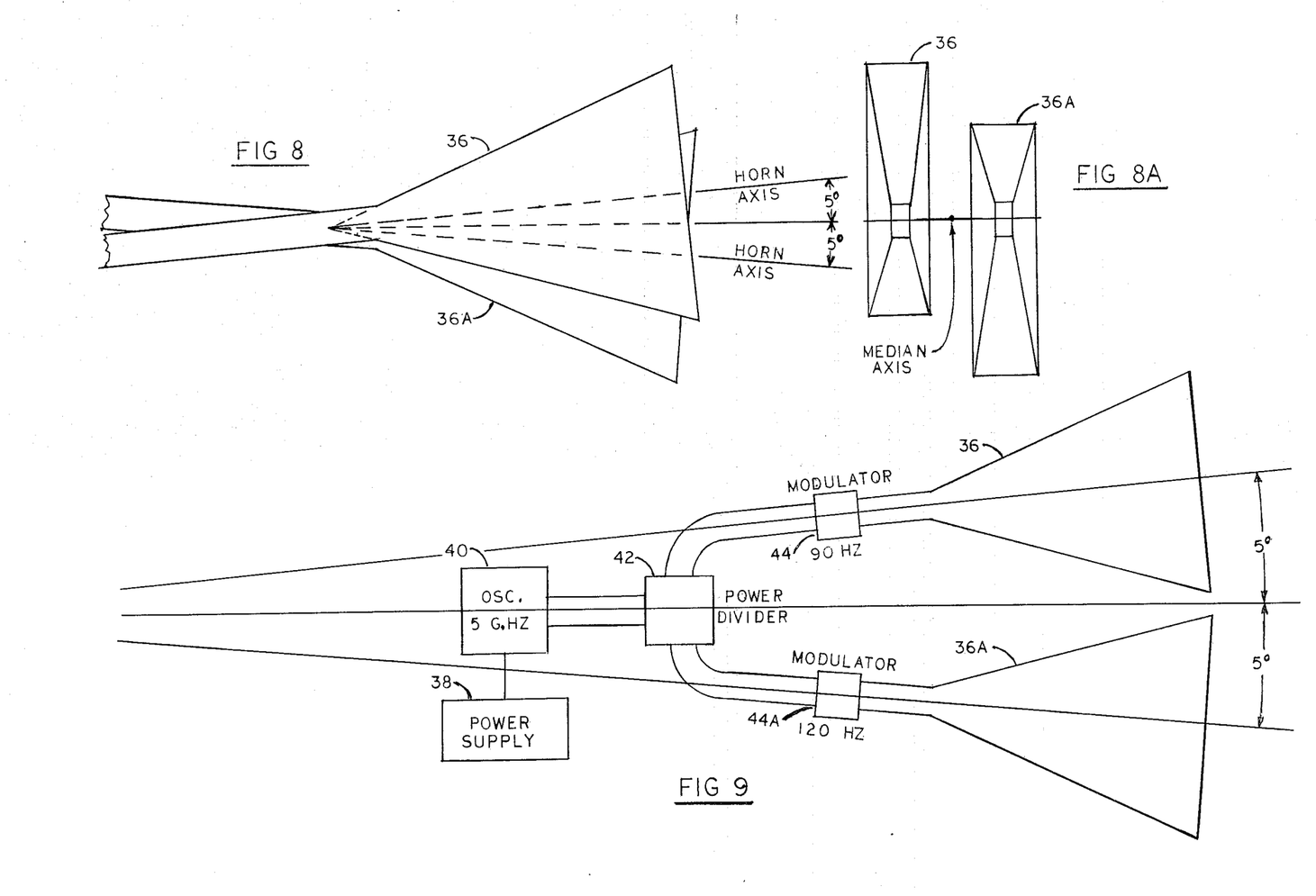
FIG. 8 shows a side view of a pair of pyramidal horns with axes diverging by 10° and with sideways displacement.
FIG. 8A is a front view of the horns in FIG. 8.
FIG. 9 depicts a schematic view of one of the two transmitters comprising the system.

FIGS. 4A and 4B show two views of a single H-flare pyramidal horn 36. The horn axis and the E-field direction define an axial E-plane. FIG. 8 shows a pair of H-flare pyramidal horns 36 and 36A in a configuration for one of the two transmitters. The horn axes are shown with a divergence angle of 10°. The two horns are separated laterally by about a wavelength to avoid any significant coupling between the electromagnetic fields of the two horns. The plane which bisects the intersection of the axial E-planes of the two horns defines the reference plane for this pair of horns. A "median axis" for this pair of horns lies in the reference plane and is located symmetrically between the two horns and is perpendicular to the paper in the end view of FIG. 8.

ORIENTATION OF TRANSMITTER ANTENNAS

The transmitter horns may be oriented by aligning the "median axis" parallel to the runway and then pointing the "median axis" upwards at the desired glide path angle γ shown in FIG. 2. The reference plane is then rotated about the median axis until it passes through the desired touch-down point, on the runway. The angle which the reference plane now makes with the horizontal is designated θ as shown in FIG. 2. Carrying out the same procedure for both transmitters defines the desired glide path by the intersection of the two reference planes. This intersection will be parallel to the median axes of both transmitters and will have the desired glide angle γ. The angle θ can be chosen as desired by positioning the two transmitters relative to the desired touch-down point. The ratio of the tangent of the glide path angle, tan γ, to the tangent of beam tilt angle, tan θ is equal to the ratio of the transmitter displacement from the runway center to the transmitter displacement measured along the runway to the touch-down point. Thus the transmitters may be located at any convenient positions by the lines defined by this ratio. It was found by experience that an angle θ of 20° is quite satisfactory. The glide slope angle θ is determined by aircraft characteristics and is usually kept in a range of 4° to 6°. Thus for θ of 20° and γ of 5°, for example, the ratio would be 0.24 which would require the transmitter to be positioned about four times as far from the touch-down point measured along the runway as its displacement from the runway center.

GLIDE PATH CONTROL AT THE TRANSMITTER

Since the glide path angle $\gamma$ is defined by the "median axis" angle position, this angle could be controlled by a suitable mechanism controlling the "median axis" position of the transmitter antennas from a remote location.

TRANSMITTER CIRCUIT CONSIDERATIONS

The transmitter circuit is shown schematically in FIG. 9 and has a power supply 38, a 5 gigahertz oscillator 40, a power divider 42, and one 90 HZ and one 120 HZ modulator 44 and 44A. The circuit is the same for each of the two transmitters. The two transmitters could be designed to operate at the same carrier frequency, say of 5 gigahertz, with resultant simplification of the receiver, and differ only in the modulation frequencies. Each transmitter has two low frequency modulation frequencies which permit separation at the receiver of the individual signals from each horn. The components of microwave oscillator, power divider and modulators comprise devices that are well known to those skilled in the art. The modulation frequencies shown as examples herein are 90 HZ and 120 HZ for one transmitter while those of the other transmitter are 150 HZ and 200 HZ. The configuration of the pyramidal horns shown in FIG. 9 is a possible alternative to that shown in FIG. 8.

The whole structure of the transmitter shown in FIG. 9 can be assembled as a rigid unit and attached to a support base with suitable adjustable gimbeling to permit the alignment of the angles $\gamma$ and $\theta$ described above. The largest components are the waveguide horns which would have apertures of 36 cm by 9 cm and a length of 54 cm for the indicated carrier frequency of 5 Gigahertz. For higher carrier frequencies, the wavelength would be shorter and the dimensions would be scaled down proportionately to the wavelength.

RECEIVER CIRCUIT CONSIDERATIONS

Figure 10:
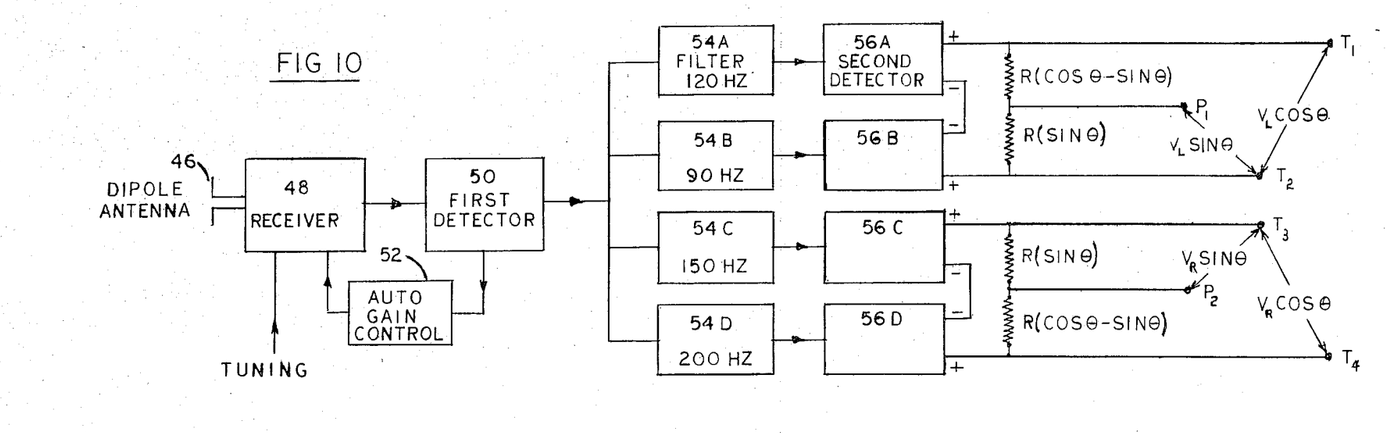
FIG. 10 is a block diagram of a portion of the receiver.

The receiver circuit is shown schematically in FIG. 10 and includes a dipole antenna 46, tuneable receiver 48, first detector 50, automatic gain control 52, narrow bandpass filters 54A, 54B, 54C, and 54D (NBPF), and second detectors 56A, 56B, 56C, 56D, are all well known to those skilled in the art. The second detector outputs are shown to be balanced against each other for signals received from each of the transmitters respectively. A simple resistance divider is shown for adjusting the output signal amplitude to correspond to $2 \cos \theta$ and $2 \sin \theta$ for deriving the "phantom" vertical and horizontal reference planes of FIG. 3. There are other ways of accomplishing this adjustment, as for example, by adjusting the sensitivity of the indicating instrument (which is in effect a pair of voltmeters). To use the outputs as shown, the required series opposing and series aiding conditions cannot both be accomplished simultaneously by direct circuit connections. These effects of either series aiding or series opposing (or both) can be produced directly in the indicating instrument by constructing the "voltmeters with a pair of excitation coils which are electrically isolated. These excitation coils are fed with the D.C. detector output voltages directly and can be poled with opposing magnetic fields for indicating the phantom azimuth plane of FIG. 3 and can be poled with aiding magnetic fields for indicating the "phantom glide slope plane" of FIG. 3.

GLIDE SLOPE CONTROL AT THE RECEIVER

The system as described will allow the pilot to follow the prescribed glide path by keeping the indicator cross pointers centered. If the pilot wishes to follow a different glide path than that of angle $\gamma$ for which the transmitters are aligned, this may be done in the following way: FIG. 7 indicates the net output signal at the receiver produced by one of the two transmitters and indicates how the reference plane is established by a zero signal output. The two beams of the transmitter, that is the upper beam and the lower beam, have equal intensities as shown in FIG. 6.

Figure 11:
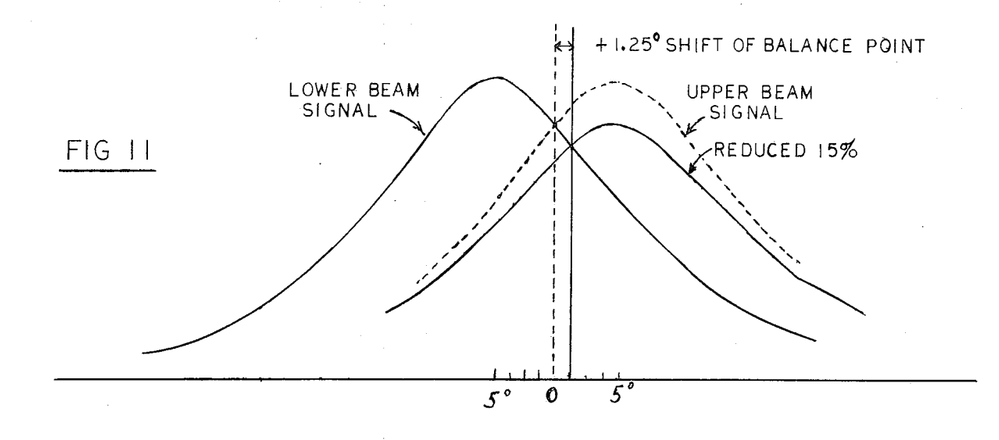
FIG. 11 shows a graph of the received signals showing shift of reference plane at the receiver.

At the receiver it is a simple matter to reduce the signal voltage output from one of the beams, for example, the upper beam of the left transmitter. The curves in FIG. 11 show how such a signal voltage reduction causes a shift in the balance point where the two signals are equal and will balance out. It is this balance point which establishes the reference plane for the pair of beams and therefore the reference plane for this transmitter has been shifted to a new position. If the signal voltage output from the upper beam of the right transmitter is accordingly reduced in the same proportion as the first, a like amount of shift will occur in the reference plane of the right beacon. These new reference planes will correspond to the increased glide path angle established by the intersection of the two new reference planes. By reducing the lower beam output signals, the shift in reference planes will establish a decrease in the glide path angle. The control for these signal adjustments can be made available to the pilot so that he can adjust the glide path angle as desired.

Figure 12A:
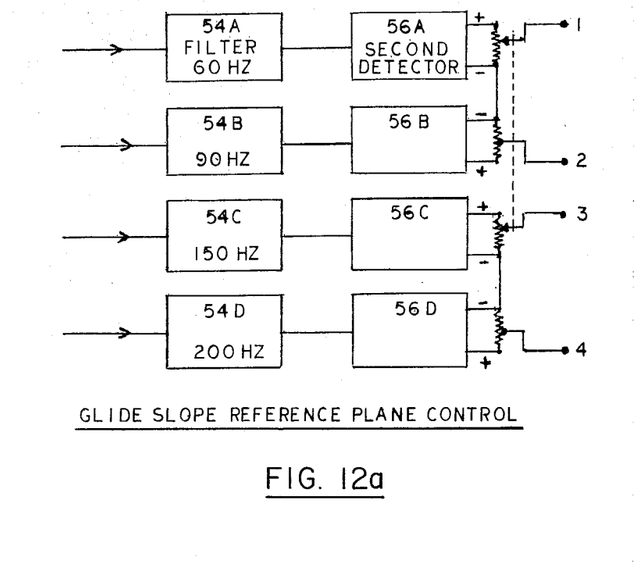
FIG. 12 and FIG. 12B is a diagram showing how the phantom glide slope plane may be shifted by a control at the receiver, and a diagram of the Flight Path Display Instrument.

A simple means for making the above-detailed adjustments in the output signal voltages of the receiver is shown in FIG. 12. The two potentiometers are linked together mechanically so that equal changes are made in the signals from the left and right transmitters.

It is also possible to shift the virtual intersection of the left and right reference beams to the left or right at the receiver (instead of up and down as described above). This is done by reducing the lower beam signal for one transmitter while reducing the upper beam signal for the other transmitter. The means for doing this with linked potentiometers controllable by the pilot is analogous to the means described above. This allows the pilot to select a different phantom azimuth plane if he so chooses.

Figure 12B:
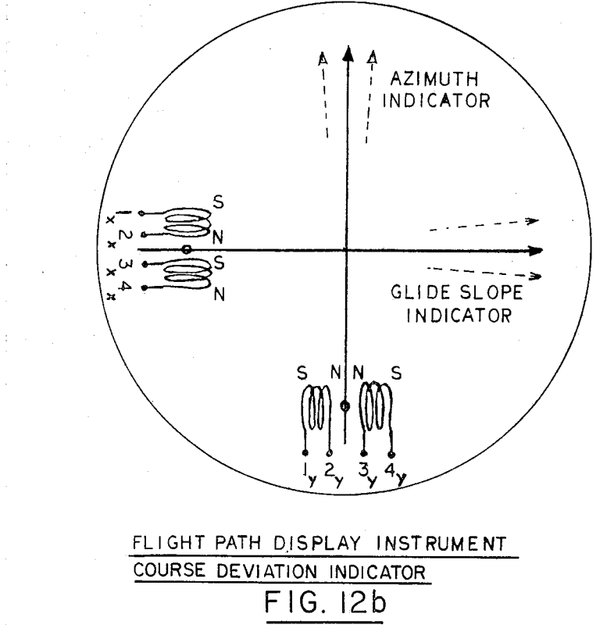

The flight path display instrument connected to the receiver is shown schematically to indicate polarity of the excitation coils for producing the required adding of signals (for glide slope) and subtracting of signals (for azimuth). Each indicator element of the Flight Path Display Instrument has four terminals $1x$, $2x$, $3x$, $4x$, and $1y$, $2y$, $3y$, $4y$, respectively which are connected to corresponding terminals 1, 2, 3, and 4 of the receiver. Potentiometers for terminals 1 and 3 are linked mechanically to control signals from the two transmitters together.

ADDITIONAL ADVANTAGES OF THE INSTRUMENT LANDING SYSTEM

Additional advantages of the instrument landing system herein described are the following. An aircraft will cast a "shadow" as it flies through a microwave beam cutting off the beam from any other aircraft flying in this "shadow". The "shadows" produced by the laterally displaced transmitters of the instrument landing system herein contemplated will diverge to either side of an aircraft following the glide path and, thus, the aircraft will not cut off the beam from a second aircraft following it on the glide path.

A unique advantage of the instrument landing system herein contemplated is the ability to control the glide slope angle by a simple adjustment at the receiver aboard the aircraft. This allows the pilot to use steep approach angles from high altitudes and to reduce this to lesser approach angles at lower altitudes and, indeed, to program a flared out approach path. Also it is possible to control the glide path azimuth by an additional simple adjustment at the receiver aboard the aircraft.

Although the instrument landing system has been described herein as using microwaves, it is possible to use any suitable means for establishing radio beams in space to define two reference planes such that an appropriate radio receiver picking up the radio beams will produce output signals which indicate the displacement of the radio receiver antenna from each of the reference planes. A D.C. output signal from the receiver can indicate the amount of the displacement by the signal voltage and the sense of the displacement (up or down) by the signal polarity.

I claim:
1. An aircraft instrument landing system for use on an aircraft runway to guide approaching aircraft along a glide path comprising in combination:
 a. first and second directional transmitters to be disposed on the left and right sides of a runway for transmitting directional radio signals in two reference planes at angles to the horizontal which will intersect to define a glide path including a high frequency oscillator complex for supplying a high frequency output carrier signal from each transmitter and modulator means for each transmitter supplying a pair of modulation signals for each transmitter which are different and identifiable;
 b. receiver means on the aircraft disposed to receive said carrier signals and including narrow band pass filter means for separating the four identifiable modulation signals;
 c. detector means coupled to said filter means including resistor divider means to adjust the intensity of said signals and means to add and subtract the received signals; and,
 d. display means coupled to said detector means and resistor divider means including indicator means visibly showing the position of the aircraft relative to a phantom glide slope reference plane, azimuth reference plane and visibly showing the signal displacement from said planes.

2. A system as claimed in claim 1 wherein said transmitters include microwave horn transmitters and said oscillator supplies a microwave signal.

3. A system as claimed in claim 2 wherein said transmitters each include at least two microwave horn antennas and said modulator means includes one modulator for each microwave horn antenna.

4. A system as claimed in claim 5 including pilot controlled means coupled to said receiver means for modifying the D.C. output signals in such a manner as to shift the phantom guide slope reference plane and additional pilot controlled means coupled to said receiver means modifying the D.C. output signals in such a manner as to shift the phantom azimuth reference plane.

5. A system as claimed in claim 1, said display means having first and second detectors with a D.C. output including sum and difference means for combining the D.C. output signals from these detectors and also with two indicators in said display means coupled to said sum and difference means and responsive thereto, one indicator being an azimuth course deviation indicator, the other indicator being a glide slope deviation indicator, said indicators being so coupled that the azimuth course deviation indicator responds to the difference of the D.C. output signals to indicate position of the receiver relative to a "phantom" azimuth reference plane and the glide slope deviation indicator responds to the sum of these D.C. signals to indicate the position of the receiver relative to a "phantom" glide slope reference plane.

* * * * *